(12) United States Patent
Michel

(10) Patent No.: US 11,295,780 B2
(45) Date of Patent: Apr. 5, 2022

(54) DATA STORAGE DEVICE WITH SEPARATE ACTUATORS

(71) Applicant: Seagate Technology, LLC, Fremont, CA (US)

(72) Inventor: Richard P. Michel, Minneapolis, MN (US)

(73) Assignee: Seagate Technology LLC

( * ) Notice: Subject to any disclaimer, the term of this patent is extended or adjusted under 35 U.S.C. 154(b) by 0 days.

(21) Appl. No.: 16/946,386

(22) Filed: Jun. 19, 2020

(65) Prior Publication Data
US 2021/0398560 A1    Dec. 23, 2021

(51) Int. Cl.
| G11B 5/54 | (2006.01) |
| G11B 20/18 | (2006.01) |
| G11B 5/55 | (2006.01) |
| G11B 20/10 | (2006.01) |
| G11B 5/596 | (2006.01) |

(52) U.S. Cl.
CPC ........ G11B 20/1879 (2013.01); G11B 5/5578 (2013.01); G11B 5/59633 (2013.01); G11B 20/10027 (2013.01); G11B 20/10037 (2013.01)

(58) Field of Classification Search
CPC ..... G11B 5/5547; G11B 5/4813; G11B 27/36; G11B 5/5578; G11B 5/54; G11B 20/1217; G11B 5/4886; G11B 5/012; G11B 5/55
USPC ...................................................... 360/69, 75
See application file for complete search history.

(56) References Cited

U.S. PATENT DOCUMENTS

| | | | |
|---|---|---|---|
| 5,223,993 A | 6/1993 | Squires et al. | |
| 5,293,282 A | 3/1994 | Squires et al. | |
| 5,613,088 A | 3/1997 | Achiwa et al. | |
| 6,057,990 A * | 5/2000 | Gilovich | G11B 5/4893 360/246.7 |
| 6,735,032 B2 * | 5/2004 | Dunn | G11B 5/59633 360/31 |
| 6,934,112 B2 * | 8/2005 | Ono | G11B 5/4976 360/75 |
| 6,937,813 B1 * | 8/2005 | Wilson | H04N 5/76 386/235 |
| 7,492,542 B2 * | 2/2009 | van Zyl | G11B 5/4806 360/61 |
| 7,760,463 B2 * | 7/2010 | Ward | G11B 21/025 360/78.12 |
| 9,564,151 B1 * | 2/2017 | Kunkel | G11B 5/3967 |
| 9,570,104 B1 | 2/2017 | Erden et al. | |
| 9,830,939 B1 | 11/2017 | Hamilton | |
| 10,037,779 B1 | 7/2018 | Mendonsa et al. | |
| 10,192,576 B1 * | 1/2019 | Gaertner | G11B 5/5578 |
| 10,366,726 B1 | 7/2019 | Granz et al. | |
| 10,431,246 B2 * | 10/2019 | Zhu | G11B 5/4813 |
| 10,510,373 B1 * | 12/2019 | Granz | G11B 20/1258 |
| 10,522,175 B1 * | 12/2019 | Horgan | G11B 5/4833 |

(Continued)

*Primary Examiner* — Nabil Z Hindi
(74) *Attorney, Agent, or Firm* — Hall Estill Law Firm

(57) ABSTRACT

A data storage device can consist of a data storage medium that has a recording surface accessed by a first transducing head suspended by a first actuator and a second transducing head suspended by a second actuator. The first actuator may be configured to access a first region of the recording surface while the second actuator is configured to access a second region of the recording surface. The first and second regions can be separate and non-overlapping.

20 Claims, 3 Drawing Sheets

(56) References Cited

U.S. PATENT DOCUMENTS

| | | | |
|---|---|---|---|
| 2007/0297083 A1* | 12/2007 | van Zyl | G11B 5/4806 360/69 |
| 2014/0063644 A1* | 3/2014 | Lou | G11B 5/3945 360/75 |

* cited by examiner

DATA STORAGE DEVICE WITH SEPARATE ACTUATORS

SUMMARY

A data storage device, in accordance with various embodiments, has a data storage medium with a recording surface accessed by a first transducing head suspended by a first actuator and a second transducing head suspended by a second actuator. The first actuator is configured to access a first region of the recording surface while the second actuator is configured to access a second region of the recording surface. The first and second regions are separate and non-overlapping.

Other embodiments of a data storage device arrange a data storage medium with a recording surface accessed by a first transducing head suspended by a first actuator and a second transducing head suspended by a second actuator. The first transducing head is configured as a read-only assembly while the second transducing head is configured as a write-only assembly.

In some embodiments, a data storage device is operated by positioning a first transducing head over a recording surface of a data storage medium with a first actuator and a second transducing head over the recording surface with a second actuator prior to writing a user-generated data block with the first transducing head to the recording surface and then reading the user-generated data block from the recording surface with the second transducing head.

DETAILED DESCRIPTION

Assorted embodiments of the present disclosure are generally directed to the intelligent use of separate dual actuators in a data storage device to optimize the efficiency and capacity of data storage.

Data storage devices employing rotating magnetic media to store data have evolved to provide stable long-term data storage. Such data storage contrasts some solid-state memories that degrade and wear out over time. However, the use of rotating magnetic media can be relatively slow with low data capacity compared to the physical size of the data storage device. Hence, there is a continued goal of increasing the effective data capacity for a given form factor of a rotating magnetic media data storage device while providing faster data access times that are competitive with solid-state memories.

Accordingly, a data storage device utilizing rotating magnetic media for data storage can employ multiple separate actuators and data transducing heads for a single data recording surface. The ability to customize separate actuators for a common data recording surface allows for multiple separate data regions that are optimized for the physical and mechanical capabilities, and limitations, of the respective actuators. As a result, data access efficiency and overall data capacity can be increased without sacrificing error rate, reliability, or form factor.

Figure 1:
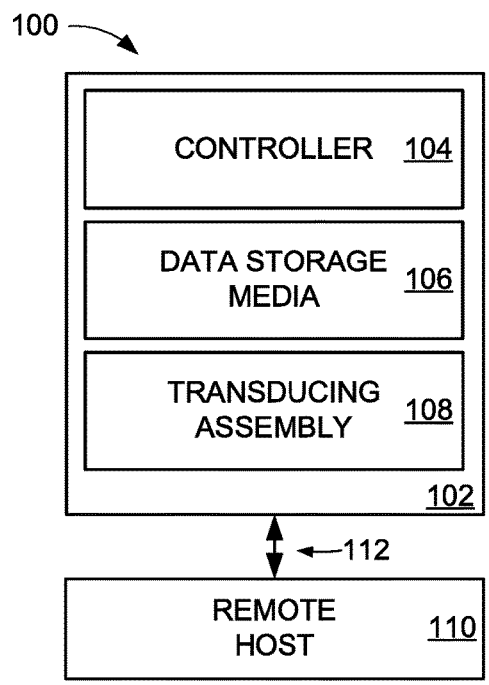
FIG. 1 is a block representation of an example data storage system in which assorted embodiments can be practiced.

A block representation of an example data storage system 100 in which various embodiments can be practiced is shown in FIG. 1. The data storage system 100 can employ any number of data storage devices 102 that each have at least one local controller 104, such as a microprocessor or other programmable circuitry, that directs data storage activity to, and from, data storage media 106 via data transducing assemblies 108. It is noted that a data storage device 102 is not limited to the particular components of FIG. 1, but can utilize the aspects displayed in FIG. 1 alone, or in conjunction with other data storage devices to service data access requests from one or more remote hosts 110 connected in a distributed network 112 spanning multiple different locations, such as different cities, countries, or continents.

Figure 2:
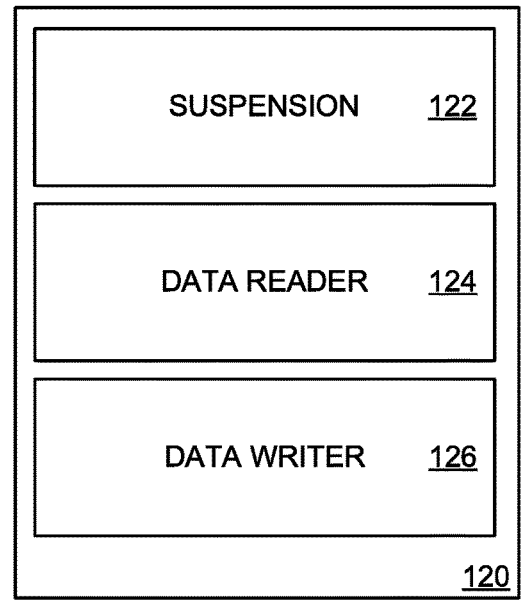
FIG. 2 depicts portions of an example data storage device that can be used in the data storage system of FIG. 1.

FIG. 2 depicts a block representation of an example data transducing assembly 120 that can be utilized in the data storage device 102 of FIG. 1. The data transducing assembly 120 can fly a predetermined air bearing distance above a rotating data storage medium 106 via a suspension 122. Selective activation of data reader 124 and/or data writer 126 aspects of the transducing assembly 120, as directed by a local controller 104, conduct data accesses that write data to, and read data from, an underlying data storage media 106. It is noted that the data reader 124 and data writer 126 aspects of the data transducing assembly 120 can be packaged together on a common substrate and collectively characterized as a data transducing head.

Figure 3:
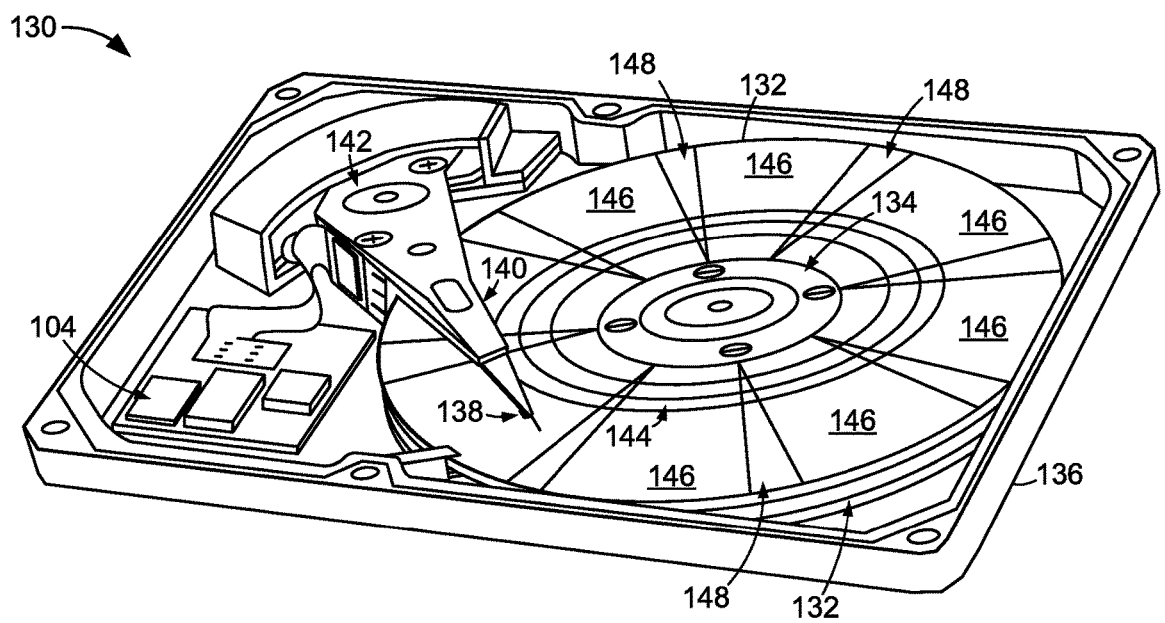
FIG. 3 depicts portions an example data storage data storage device configured in accordance with various embodiments.

FIG. 3 depicts portions of an example data storage device 130 that can be utilized in the data storage system 100 of FIG. 1. The device 130 positions a plurality of data storage media 132 are vertically stacked and aligned about a spindle 134 that can selectively spin the media 132 as directed by a local controller 104 resident in a circuit board packaged in a single sealed, or unsealed, housing 136 with the media 132. The controller 104 can additionally direct operation of one or more transducing heads 138 positioned at a distal end of a suspension 140 from an actuator 142 that selectively moves the respective heads 138 over different tracks 144 spaced throughout the media 132.

The line representation of an example data track 144 depicts how magnetic portions of a data storage medium 132 can be logically divided into different zones enforced by the local controller 104. The data track 144 can have a number of user data regions 146 where end-user data is stored, and retrieved, to service data access requests from one or more remote hosts. The user data regions 146 positioned circumferentially around a data storage medium 132 can be separated by servo regions 148 where non-user generated, system data is stored and not accessible by an end user of the data storage device 130. The servo regions 148 may be arranged as radially extending wedges or continuous spirals that provide information, such as grey code, error correction, position error sensing, and data track gates, for each data track 144.

Figure 4:
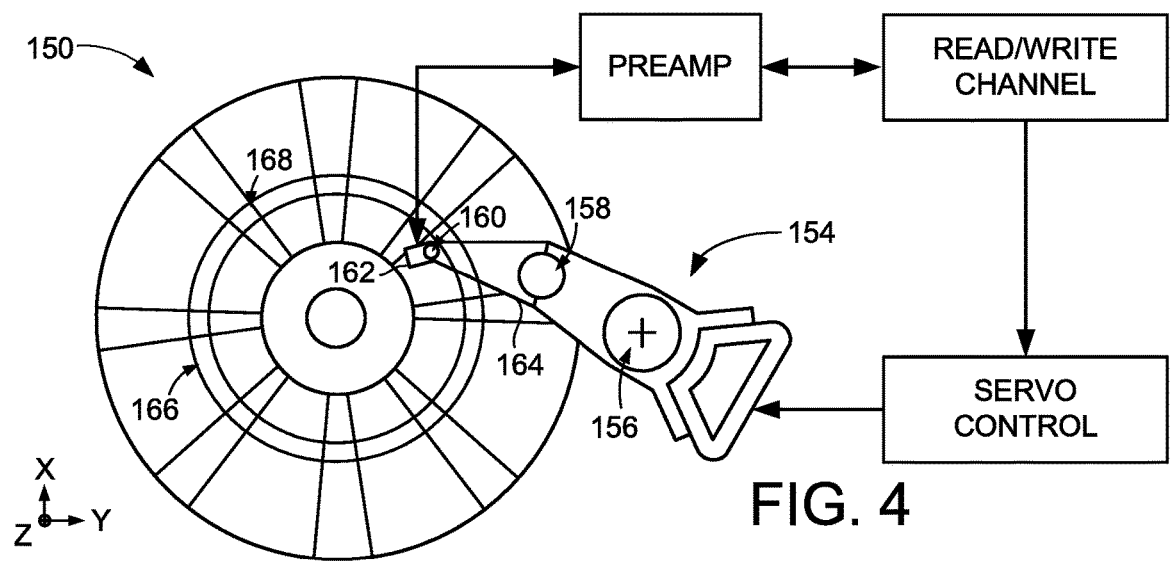
FIG. 4 depicts portions of an example data storage device that may be employed in the data storage system of FIG. 1.

FIG. 4 depicts a top view of portions of an example data storage device 150 arranged in accordance with some embodiments to provide increased data storage performance from a rotating magnetic medium 152. As shown, an actuator 154 can be configured with multiple joints 156/158/160 that each provide a range of motion independent of each other, within the single actuator 154 structure. The ability to manipulate the position of the transducing head assembly 162 at the end of the actuated load beam 164 allows for precise adjustments to operating conditions, such as skew angle, repeatable run-out, and mechanical stress.

It is noted that the actuator 154 may be configured with one or more joints that articulate upon activation along the Z-Y plane, which may complement the joints 156/158/160 that each articulate upon activation in the X-Y plane. The number, type, and operation of the assorted joints are not limited and can be customized to position the head assembly 162 over a selected user data track 166 and/or servo portion 168 as quickly and accurately as possible. For instance, a first joint 156 can provide relatively coarse resolution and a wide range of motion while the second joint 158 and third joint 160 respectively provide tighter resolution and range of motion. The respective joints 156/158/160 can have one or more microactuators, such as piezoelectric structures, that can be activated to effect precise head assembly 162 movement quickly.

Despite the number of joints 156/158/160 and sophistication of the configuration and operation of the actuator 154, data access times and data capacity of the data storage medium 122 can be limited by the use of a single actuator 154. For example, a single actuator 154 is mechanically limited by the speed in which it can physically translate a head assembly 162 from one position to another position on the recording surface 170 of the data storage medium 162. Likewise, the accurate performance of the head assembly 162 can be limited by the skew angle capabilities of the actuator 154, as illustrated by the angle of the load beam 172 and corresponding head assembly 162 relative to the radial centerline of a data track 166. Hence, despite several different joints 156/158/160, the areal data density of the recording surface and the speed of accurately accessing data from data tracks 166 can be limited.

Figure 5:
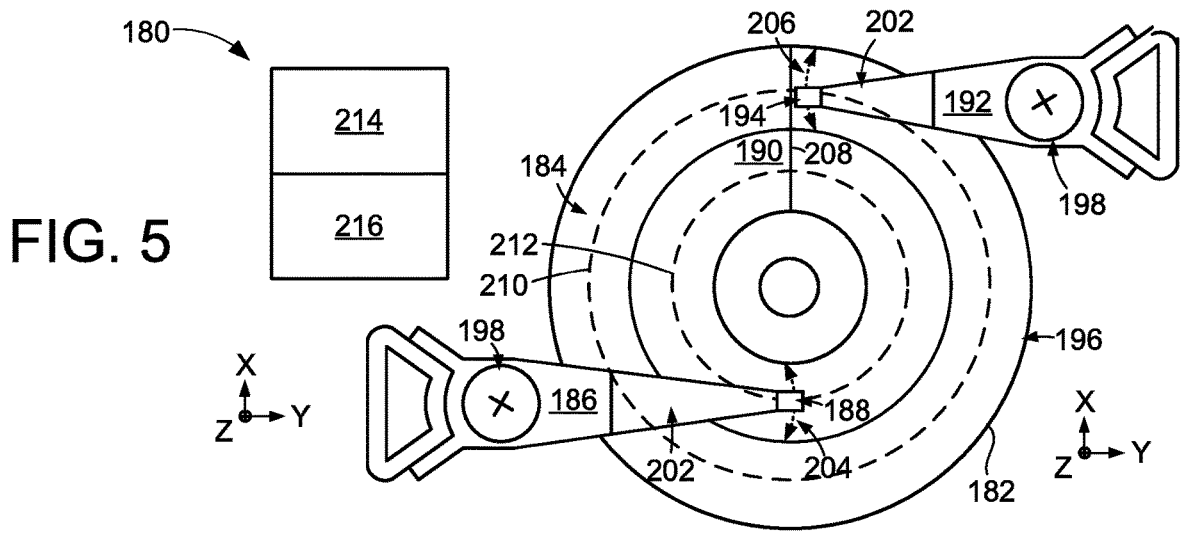
FIG. 5 depicts a top view representation of portions of a data storage device configured and operated in accordance with assorted embodiments.

FIG. 5 depicts a top view line representation of portions of an example data storage device 180 in which assorted embodiments can be practiced to optimize a data storage medium 182 and recording surface 184 for at least data capacity and data access speed. As shown, a first actuator 186 can position a first transducing head 188 over a first region 190 of the recording surface 184 while a second actuator 192 positions a second transducing head 194 over a second region 196 of the recording surface 184. It is noted that each transducing head 194 may be constructed of one or more data readers or data writers that can concurrently, or independently, operate to read data from, or write data to, the user data portions of one or more data tracks 166. While the actuators 186/192 are each shown in FIG. 4 with a single joint 198, it is contemplated that an actuator 186/192 can have multiple joints and microactuators can provide multi-axis load beam manipulation in the X-Y plane. It is further contemplated that the actuators 186/192 can be configured differently to provide different movement speed, physical resolution, skew angle sensitivity, and air bearing size. The ability to customize the physical configuration of the actuators 186/192 and heads 188/194 allows for optimization of the respective regions 190/196 to provide matching, or dissimilar, data density and/or data access times for the recording surface 184.

In a non-limiting embodiment, the respective actuators 186/192 are physically positioned and operated within the respective regions 190/196. That is, the voice coil motors 200 of the respective actuators 186/192 are positioned relative to the approximate radial center of the respective regions 190/196 so that the respective load beams 202 have minimal angular offset throughout the range of head 188/194 travel, as shown by segmented lines 204 & 206. For instance, the respective spindle motor joints can be positioned so that each load beam 202 is perpendicular with a radius 208 when the heads 188/194 are aligned with a radial centerline 210/212 of the respective regions 190/196.

By restricting the range of movement of the respective actuators 186/192 to less than all the recording surface, such as an inner half 190 and outer half 196 of the radius 208, individual load beam 202 geometry is optimized for a short skew range, which allows an air bearing to be reduced and medium 182 to be increased. The reduced skew range of the respective heads 188/194 decreases the stroke of the respective actuators 186/192, which corresponds with reduced seek latency and power consumption by the spindle motors 200. Such reduced skew angle may also optimize multi-sensor magnetic recording (MSMR) operation by more precisely aligning multiple data readers, or writers, in a single head 188/194 with a data track 166.

Regardless of the physical and operational optimizations provided by the separate actuators 186/192, the presence of separate heads 188/194 accessing the different regions 190/196 allows for different data storage configurations on the recording surface 184. As a non-limiting example, the first region 190 can have a first data track 166 configuration while the second region 196 has a second data track 166 configuration with each configuration corresponding to different data track widths, track buffer sizes, and/or track layouts. For instance, one region 190/196 can have a shingled data track configuration with overlapping tracks 166 optimized for data capacity while the other region 190/196 has data track configuration with separate tracks 166 organized for fast data access speeds.

Through the various embodiments of the concurrent and separate data regions 190/196 respectively accessed by the separate and independent heads 188/194 suspended by the respective actuators 186/192, the overall data capacity of the recording surface 184 and data storage medium 182 can be increased. The sensitivity of transducing heads 188/194 to skew angle, particularly with advanced air bearings that are quite small, corresponds with greater areal data density and/or data track density as the respective actuators 186/192 have smaller skew ranges and ranges of motion than the single actuator 154 of FIG. 3. Further areal data density and data capacity gains can be achieved by optimizing the configuration of a transducing head 188/196, such as a data writer write pole shape, size, and position or a data reader alignment or number of readers.

It is contemplated that a reduced skew angles and media velocity range afforded by the concurrent and separate actuators 186/192 allows different air bearing clearances and/or spacing stability. Additionally, the reduction of actuator range of motion decreases seek latency contribution to the overall data access time, which provides higher performance for the respective regions 190/196 than a single actuator 154 having a full radius stroke and range of movement. Thus, the respective heads 188/194 can provide separately optimized, concurrent operation for parallel performance.

A non-limiting embodiment of the data storage device 180 configures one actuator 186/192 as a reader with a head 188/194 having only data reading transducers while the other actuator 186/192 is configured as a writer with a head 188/194 having only data writing transducers. In such an embodiment, the respective actuators 186/192 would each have the full stroke, skew, and range of motion throughout the radius 208, which could add access latency, but allows for optimized reading and/or writing as the heads 188/194 each have more room to align, position, shape, and configure the respective data reader or data writer transducers. For instance, multiple redundant, concurrent, and sequential readers or writers, which may be matching or dissimilar types of readers or writers, may be positioned on a single head 188/194 due to the availability of space compared to a co-located reader-writer transducing head.

The configuration of a transducing head 188/194 with readers or writers allows for different air bearing configurations and adaptations over time to provide increased speed, accuracy, and efficiency. Some embodiments can relax the head-media spacing for a reader compared to a writer air bearing size. The use of dual actuators 186/192 and heads 188/194 can allow for a dedicated read back data reader transducer, or even a dedicated read back actuator 186/192. Read back operation may involve, in some embodiments, multiple input, single output (MISO) circuitry to align and weight filter data to improve signal-to-noise (SNR).

A dedicated data writing transducing head 188/194 can be configured with a data writer arranged to solely write user data and another data writer to solely write servo data. With the configuration of separate and dedicated data reader and data writer heads 188/194, it is contemplated that separate preamp 214 and/or controller 216 circuitry can be utilized. The separation of preamps 214 may correspond with an analog signal processing without a digital conversion for data reading and/or data writing.

Figure 6:
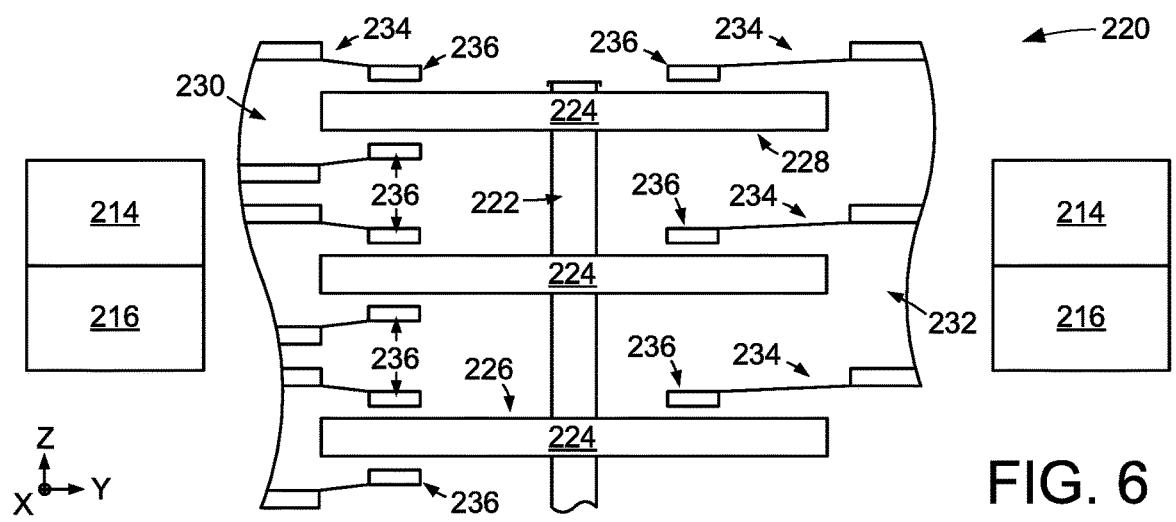
FIG. 6 depicts a top view representation of portions of a data storage device arranged in accordance with some embodiments.

FIG. 6 depicts a side view representation of an example data storage stack 220 portion of a data storage device arranged and operated in accordance with various embodiments. The stack 220 has a central spindle 222 that supports and rotates a plurality of separate data storage media 224 that each have a top 226 and bottom 228 recording surface. The respective recording surfaces 226/228 are accessed by a first comb 230 and a separate second comb 232. It is contemplated that the respective combs 230/232 have matching configurations with actuators 234 suspending transducing heads 236 above particular recording surfaces 226/228.

In the non-limiting embodiment shown in FIG. 5, the first comb 230 positions actuators 234 and heads 236 next to each top 226 and bottom 228 recording surface while the second comb 232 positions heads 236 next to only the top recording surfaces 226. As a result, the bottom recording surfaces 228 each have a single transducing head 236 and each top recording surface 226 has multiple separate heads 236. The ability to customize the number of heads/actuators for a comb 230/232 allows for optimized performance with minimal increased data access complexity. For example, the top recording surfaces 226 having multiple separate operational heads 236 can provide different data access capabilities and performance, such as data access latency, susceptibility to skew angle, and power consumption, than the bottom recording surfaces 228 employing a single head 236.

It is contemplated that one comb 230/232 can be selectively activated for redundant, concurrent, or sequential access to data. For instance, comb 230 may be active for normal data access operations and comb 232 is powered up and utilized in response to an event, such as when relatively large amounts of data writes or data reads are pending or if error rates are above a predetermined threshold. It is noted that the combs 230/232 can be activated and customized to provide deterministic data access performance for a given amount of time, such as consistent data read latency at the expense of peak data read latency.

The respective combs 230/232 can be connected through a single preamp 214 and controller 216, in some embodiments, while other embodiments connect each comb 230/232 to a separate preamp 214 circuitry, which allows for concurrent operation of multiple different heads 236 on a single recording surface 226/228. The separation of data between preamps 214 for the respective combs 230/232 further allows for customized data handling between the heads 236 of the respective combs 230/232, such as MISO, analog front end, and multiple converters (ADC).

Figure 7:
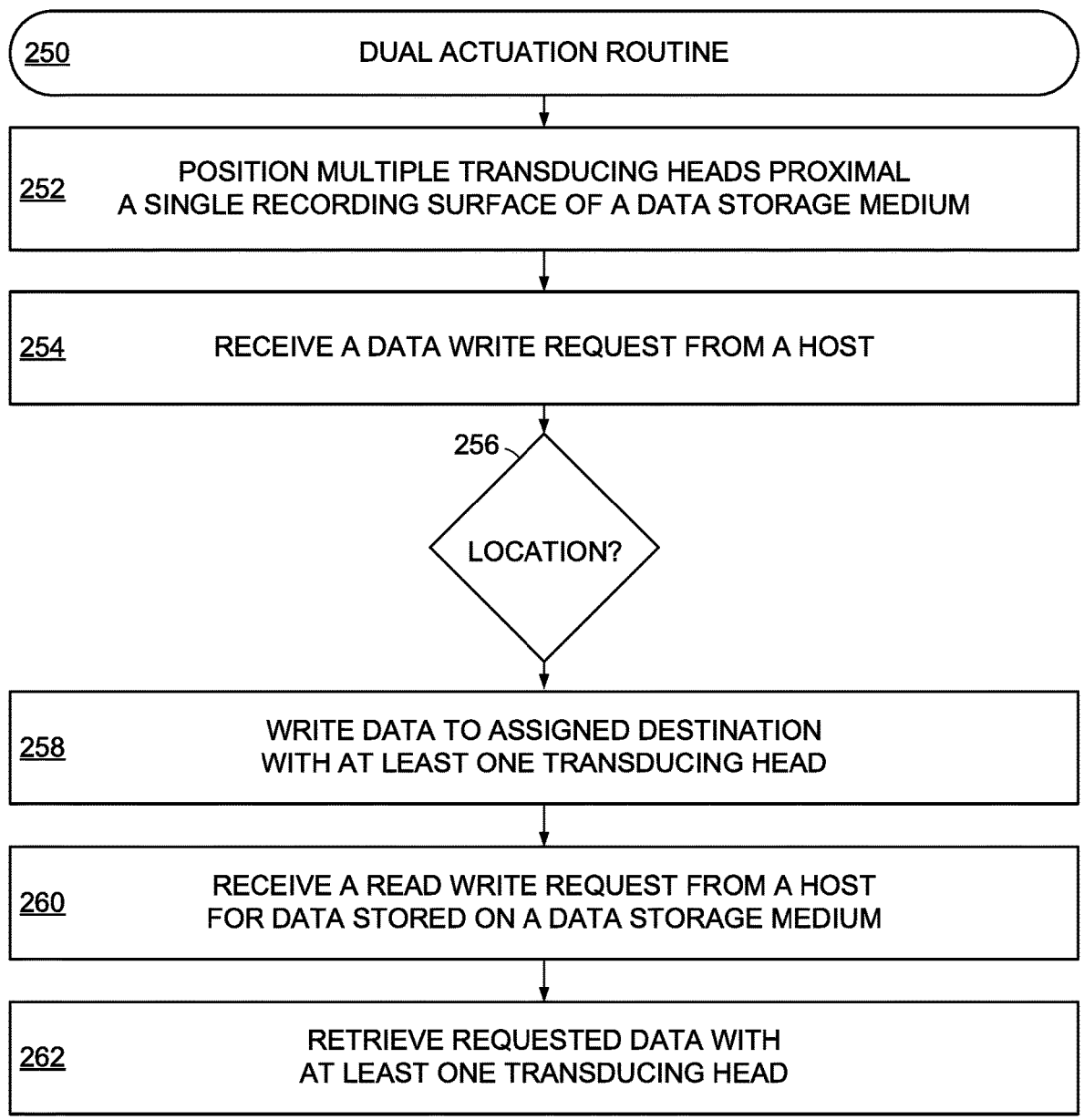
FIG. 7 provides a flowchart of an example dual actuation routine that carried out in accordance with various embodiments.

FIG. 7 conveys an example dual actuation routine 250 that can be carried out in a data storage device in accordance with the assorted embodiments of FIGS. 1-5. The routine 250 can begin with step 252 positioning multiple transducing heads proximal a data storage surface of a data storage medium in a data storage device. The transducing heads can be on separate actuators and can be configured with matching, or different, mechanical, operational, and data access capabilities and performance. For instance, the separate transducing heads may each have data readers or writers that have matching or different capabilities, such as different types sizes, or speeds of data transducer. It is contemplated that the separate actuators can employ only data readers or writers, but such configuration is not required as an actuator can have both a data reader and a data writer.

A data write request is received in step 254 and is accompanied by user-generated data. Decision 256 evaluates the user-generated data along with current data storage conditions and performance to determine an optimal location to write the user-generated data. For instance, decision 256 can determine that highly secure data needs to be assigned to a data region with slower data access speeds and smaller areal data density, but very high reliability and read latency consistency. Conversely, decision 256 may assign user-generated data to a high areal density region accessed by a fast, but relatively unreliable data reader, based on the user-generated data being less secure and more frequently accessed by a host.

Accordingly, decision 256 can intelligently pair user-generated data to a data recording surface region corresponding to an actuator and transducing head. It is contemplated that decision 256 can further assign a destination for user-generated data after a comparison of data access performance from a data region accessed by a single actuator or by multiple actuators. As a result, user-generated data can be stored with optimal write and read performance over time based on the attributes of the data, such as size, host providing the data, assigned logical address, and encryption, as well as the attributes of the data storage device, such as error rate, read latency, write latency, seek latency, air bearing size, and actuator skew angle.

At least one data transducer suspended by an actuator is employed in step 258 to store data on a data storage surface of a data storage medium according to the data destination assigned by decision 256. Step 258 can be revisited and executed a number of times to store any amount of data to any number of data surfaces and data storage media of a device with one or more data writers. That is, step 258 can utilize a single data writer, and corresponding actuator, or many different data writers accessing a single data recordings surface or many recording surfaces to store user-generated data to user data addresses assigned by a device controller and carried out with the aid of at least one preamp.

At some point after user data has been stored to a recording surface, step 260 receives a read request for user data stored on a data storage medium. The requested data is then retrieved in step 262 by a transducing head suspended by an actuator. It is noted that the user-generated data can be stored to a recording surface with a first transducing head from a first actuator and then subsequently read from the recording surface with a transducing head from a second actuator, but such arrangement is not required as a single transducing head may be used to both read and write data to a recording surface. The various embodiments of a recording surface accessed by separate actuators and transducing heads allow for redundant reading of data by separate data readers located of different actuators, which provides parallel operation that can increase data access efficiency and performance without sacrificing accuracy and reliability.

Through the assorted embodiments of a data storage device employing multiple separate actuators accessing a single data recording surface, the data capacity and data access performance of the device can be optimized. The ability to utilize different transducing heads for a recording surface allows for concurrent and/or redundant operation with matching, or dissimilar, data access performance characteristics. Having multiple separate data transducing heads suspended by different actuators allows a single data recording surface to have differently configured regions, such as shingled data tracks in one region and two-dimensional data tracks in an adjacent second region, which increases the power and data access efficiency compared to having a single data track format for the entire recording surface.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a data storage medium having a recording surface accessed by a first transducing head suspended by a first actuator of a first comb and a second transducing head suspended by a second actuator of a second comb, the first actuator configured to access a first region of the recording surface, the second actuator configured to access a second region of the recording surface, the first and second regions being separate and non-overlapping, the first transducing head accessing data from the recording surface with a different air bearing size than the second transducing head, the respective air bearing sizes concurrently present and measured from the recording surface to the respective transducing heads.

2. The apparatus of claim 1, wherein the first actuator comprises a first voice coil joint positioned perpendicular to a radial centerline of the first region.

3. The apparatus of claim 2, wherein the second actuator comprises a second voice coil joint positioned perpendicular to a radial centerline of the second region.

4. The apparatus of claim 1, wherein the first and second actuators each have a stroke of less than a full stroke of the recording surface, the full stroke corresponding to an inner diameter of the recording surface to an outer diameter of the recording surface.

5. The apparatus of claim 1, wherein the first region has a different data track formatting than the second region.

6. The apparatus of claim 1, wherein the first transducing head has different data access capabilities than the second transducing head.

7. The apparatus of claim 1, wherein the first transducing head has a different data writing performance than the second transducing head.

8. A method comprising:
    positioning a first transducing head over a recording surface of a data storage medium with a first actuator and a second transducing head over the recording surface with a second actuator;
    writing a user-generated data block with the first transducing head to the recording surface;
    reading the user-generated data block from the recording surface with the first transducing head; and
    reading the user-generated data block from the recording surface with the second transducing head, the first transducing head operating with a different air bearing size than the second transducing head, the air bearing size measured from the recording surface to the respective transducing heads.

9. The method of claim 8, wherein the first transducing head has a different data access latency than the first transducing head.

10. The method of claim 8, wherein the second transducing head redundantly reads the user-generated data block.

11. The method of claim 8, wherein the first transducing head has a first data writer configured to write user-generated data and a second data writer configured to write servo data.

12. The method of claim 8, wherein the second transducing head is dedicated to reading read back data from the recording surface.

13. The method of claim 8, wherein the second transducing head reads data from the recording surface as an analog signal.

14. The method of claim 13, wherein the analog signal is converted to a digital signal by a connected preamp circuitry.

15. A data storage device comprising a first data storage medium having a first recording surface accessed by a first transducing head suspended by a first actuator of a first comb and a second transducing head suspended by a second actuator of a second comb, the first comb configured to access a first region of the recording surface, the second comb configured to access a second region of the first recording surface, the first and second regions being separate and non-overlapping, the first region having a different data track arrangement than the second region, a second data storage medium is connected to the first data storage medium by a central spindle, the second data storage medium comprising a top recording surface accessed by a third transducing head suspended by a second actuator of the first comb and a fourth transducing head suspended by a second actuator of the second comb.

16. The data storage device of claim 15, wherein the first data storage medium has a second recording surface opposite the first recording surface, the second recording surface accessed by a third transducing head suspended by a second actuator of the first comb.

17. The data storage device of claim 16, wherein the second recording surface is accessed by the single third transducing head.

18. The data storage device of claim 15, wherein the first data storage medium has a top recording surface and a bottom recording surface.

19. The data storage device of claim 15, wherein the first transducing head comprises multiple data readers.

20. The data storage device of claim 19, wherein the multiple readers redundantly read data from the first recording surface.

* * * * *